(12) United States Patent
Kuwahara et al.

(10) Patent No.: US 9,056,976 B2
(45) Date of Patent: Jun. 16, 2015

(54) THERMOPLASTIC POLYMER COMPOSITION AND MOLDINGS THEREOF

(75) Inventors: Shigenao Kuwahara, Ibaraki (JP); Asako Minamide, Ibaraki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 270 days.

(21) Appl. No.: 13/638,312

(22) PCT Filed: Mar. 30, 2011

(86) PCT No.: PCT/JP2011/058131
§ 371 (c)(1),
(2), (4) Date: Nov. 26, 2012

(87) PCT Pub. No.: WO2011/125796
PCT Pub. Date: Oct. 13, 2011

(65) Prior Publication Data
US 2013/0090420 A1    Apr. 11, 2013

(30) Foreign Application Priority Data
Mar. 31, 2010    (JP) ................... 2010-082460

(51) Int. Cl.
| C08F 216/38 | (2006.01) |
| C08L 53/02 | (2006.01) |
| C08G 81/02 | (2006.01) |
| C08F 8/28 | (2006.01) |

(52) U.S. Cl.
CPC ............. *C08L 53/02* (2013.01); *C08L 53/025* (2013.01); *C08L 2205/025* (2013.01); *C08G 81/027* (2013.01); *C08F 2810/40* (2013.01); *C08L 2205/035* (2013.01); *C08L 2207/04* (2013.01); *C08F 8/28* (2013.01)

(58) Field of Classification Search
USPC .................................................. 525/61, 89
See application file for complete search history.

(56) References Cited

U.S. PATENT DOCUMENTS

| 2005/0187355 A1 | 8/2005 | Tasaka et al. |
| 2007/0276092 A1 | 11/2007 | Kanae et al. |
| 2010/0273012 A1 | 10/2010 | Moriguchi et al. |

FOREIGN PATENT DOCUMENTS

| JP | 63 25005 | 2/1988 |
| JP | 9 156035 | 6/1997 |
| JP | 2004 59635 | 2/2004 |
| JP | 2004 59636 | 2/2004 |
| JP | 2005 264139 | 9/2005 |
| JP | 2006 206715 | 8/2006 |
| JP | 2006 291019 | 10/2006 |
| JP | 2007 169656 | 7/2007 |
| JP | 2009 227844 | 10/2009 |
| JP | 2010 1364 | 1/2010 |
| WO | 2005 063876 | 7/2005 |
| WO | 2009 081877 | 7/2009 |

OTHER PUBLICATIONS

International Search Report Issued May 24, 2011 in PCT/JP11/58131 Filed Mar. 30, 2011.
U.S. Appl. No. 13/808,688, filed Jan. 7, 2013, Minamide, et al.
U.S. Appl. No. 13/812,359, filed Jan. 25, 2013, Minamide, et al.
U.S. Appl. No. 13/818,695, filed Feb. 25, 2013, Minamide, et al.
U.S. Appl. No. 14/371,858, filed Jul. 11, 2014, Minamide, et al.

*Primary Examiner* — Jeffrey Mullis
(74) *Attorney, Agent, or Firm* — Oblon, McClelland, Maier & Neustadt, L.L.P.

(57) ABSTRACT

The invention provides a thermoplastic polymer composition containing a hydrogenated block copolymer mixture (a), a polyvinyl acetal (b), and a thermoplastic elastomer (c), wherein the hydrogenated block copolymer mixture (a) contains a hydrogenated block copolymer (a1) containing hydrogenated polymer blocks (A1) containing aromatic vinyl units and hydrogenated polymer blocks (B1) containing conjugated diene units and a hydrogenated block copolymer (a2) containing hydrogenated polymer blocks (A2) containing aromatic vinyl units and hydrogenated polymer blocks (B2) containing conjugated diene units; (A1) content is 5 mass % or higher and lower than 40 mass % in (a1); (A2) content is 40 mass % to 70 mass % in (a2); the polyvinyl acetal (b) has been produced through acetalization of a polyvinyl alcohol; and the thermoplastic elastomer (c) contains hydrogenated polymer blocks (A3) containing aromatic vinyl units, hydrogenated polymer blocks (B3) containing conjugated diene units, and polymer blocks having a polar functional group (C).

20 Claims, No Drawings

THERMOPLASTIC POLYMER COMPOSITION AND MOLDINGS THEREOF

TECHNICAL FIELD

The present invention relates to a thermoplastic polymer composition which is excellent in flexibility, mechanical properties, moldability, and coloring resistance and which provides excellent adhesion to polar resin, a resin containing an inorganic filler (particularly, glass fiber), ceramic material, glass, or metal, and to an article formed from the thermoplastic polymer composition.

BACKGROUND ART

Hitherto, there have been proposed a variety of block copolymers each formed of polymer blocks (A) predominantly containing aromatic vinyl compound units and polymer blocks (B) predominantly formed of conjugated diene compound units, which are called "A-(B-A)n" type block copolymers or "(A-B)n" type (wherein n is an integer of 1 or more) block copolymers, as well as corresponding hydrogenated block copolymers produced by hydrogenating carbon-carbon double bonds originating from the conjugated diene compound units forming the polymer blocks B. By virtue of excellent flexibility and mechanical properties, the hydrogenated block copolymers have been conventionally used as an alternative to vulcanized rubber and soft vinyl chloride for production of various articles.

Meanwhile, many articles, including home appliances, electronic parts, machine parts, and automobile parts are produced from a wide variety of polar resins, resins containing an inorganic filler (particularly, glass fiber), ceramic materials, glass materials, and metals, which are excellent in durability, heat resistance, and mechanical strength. In some cases, a highly flexible elastomer member is attached to or hybridized with these articles for the purposes of fixation to other structural members, shock absorption, prevention of breakage, sealing, etc., depending on the use, configuration, application mode, etc. of the articles.

Such elastomer members would be formed from a thermoplastic elastomer composition comprising the aforementioned hydrogenated block copolymer which is a suitable material having excellent flexibility, mechanical properties, and moldability. However, since the hydrogenated block copolymer is a material of low polarity, the block copolymer has insufficient adhesion to polar resin, resin containing inorganic filler (particularly, glass fiber), ceramic material, glass, metal, etc. Without any further treatment, the block copolymer is difficult to adhere to such a material through melt adhesion, which is problematic. Therefore, in order to adhere the hydrogenated block copolymer to polar resin, resin containing inorganic filler (particularly, glass fiber), ceramic material, glass, or metal, an adhesive is used, or the surface of polar resin, resin containing inorganic filler (particularly, glass fiber), ceramic material, glass, or metal is treated in advance with a primer or the like (see Patent Documents 1 to 6).

However, the aforementioned method employing an adhesive or a primer makes the production steps cumbersome, to thereby lower productivity and elevate production cost. For dissolving such problems, Patent Document 7 discloses a thermoplastic polymer composition comprising the block copolymer and polyvinyl acetal, the composition providing excellent adhesion to polar resin, glass, metal, or ceramic material. Patent Document 7 also discloses that use of the block copolymer in combination with a similar block copolymer having a polar functional group leads to enhancement in mechanical properties and adhesion, with preventing an increase in material cost. These physical properties are considered to be enhanced through the following mechanism. That is, the block copolymer having a polar functional group enhances the compatibility of the block copolymer to polyvinyl acetal, whereby dispersibility of the polyvinyl acetal phase increases, and the interfacial adhesion of the block copolymer phase is reinforced. However, the thermoplastic polymer composition containing, in combination, the block copolymer and a similar block copolymer having a polar functional group tends to exhibit high melt viscosity, although it exhibits excellent flexibility, mechanical properties, and adhesion. Thus, when the thermoplastic polymer composition is subjected to injection molding or a similar working process, fluidity of the composition must be further improved. In addition, due to low fluidity, the thermoplastic polymer composition must be molded at high temperature. Since the composition may generate strong shear or heat during molding, the article tends to be deteriorated or to be colored. In addition, the flexibility, mechanical properties, moldability, and coloring resistance of the thermoplastic polymer composition disclosed in Patent Document 7 may be further enhanced. Previous studies by the present inventors have revealed that in some cases the adhesion provided by the composition is not necessarily excellent.

PRIOR ART DOCUMENTS

Patent Documents

Patent Document 1: Japanese Patent Application Laid-Open No. 2006-291019
Patent Document 2: Japanese Patent Application Laid-Open No. 2006-206715
Patent Document 3: Japanese Patent Application Laid-Open No. Sho 63-25005
Patent Document 4: Japanese Patent Application Laid-Open No. Hei 9-156035
Patent Document 5: Japanese Patent Application Laid-Open No. 2009-227844
Patent Document 6: Japanese Patent Application Laid-Open No. 2010-1364
Patent Document 7: WO 2009/081877

SUMMARY OF THE INVENTION

Problems to be Solved by the Invention

Thus, an object of the present invention is to provide a thermoplastic polymer composition which is excellent in flexibility, mechanical properties, moldability, and coloring resistance and which provides excellent adhesion to polar resin, a resin containing an inorganic filler (particularly, glass fiber), ceramic material, glass, or metal. Another object is to provide an article formed from the thermoplastic polymer composition.

Means for Solving the Problems

The present inventors have conducted extensive studies to attain the objects, and have found that a thermoplastic polymer composition containing, at specific proportions, two specific hydrogenated block copolymers, a specific polyvinyl acetal, and a thermoplastic elastomer containing a polymer block having a polar functional group can attain the aforementioned objects. The present invention has been accomplished on the basis of this finding.

Accordingly, the present invention is directed to the following [1] to [8].

[1] A thermoplastic polymer composition comprising:
100 parts by mass of a hydrogenated block copolymer mixture (a);
0.1 to 100 parts by mass of a polyvinyl acetal (b); and 0.1 to 20 parts by mass of a thermoplastic elastomer (c),
wherein the hydrogenated block copolymer mixture (a) comprises:
a hydrogenated block copolymer (a1) comprising at least one polymer block which has aromatic vinyl compound units (A1) and at least one polymer block which has conjugated diene compound units and which has been hydrogenated (B1) and having a polymer block (A1) content of 5 mass % or higher and lower than 40 mass %, and
a hydrogenated block copolymer (a2) comprising at least one polymer block which has aromatic vinyl compound units (A2) and at least one polymer block which has conjugated diene compound units and which has been hydrogenated (B2) and having a polymer block (A2) content of 40 mass % to 70 mass %;
the polyvinyl acetal (b) has been produced through acetalization of a polyvinyl alcohol having an average polymerization degree of 100 to 4,000 and has an acetalization degree of 55 to 88 mol %; and
the thermoplastic elastomer (c) comprises at least one polymer block which has aromatic vinyl compound units (A3), at least one polymer block which has conjugated diene compound units and which has been hydrogenated (B3), and at least one polymer block having a polar functional group (C).

[2] The thermoplastic polymer composition as described in [1] above, wherein the polyvinyl acetal (b) is polyvinyl butyral.

[3] The thermoplastic polymer composition as described in [1] or [2] above, which further contains a softener (d) in an amount of 0.1 to 300 parts by mass with respect to 100 parts by mass of the hydrogenated block copolymer mixture (a).

[4] The thermoplastic polymer composition as described in any of [1] to [3] above, which has a ratio by mass of hydrogenated block copolymer (a1) to hydrogenated block copolymer (a2) [(a1)/(a2)] of 99/1 to 50/50.

[5] An article formed from a thermoplastic polymer composition as recited in any of [1] to [4] above.

[6] The article as described in [5] above, wherein the thermoplastic polymer composition is adhered to a polar resin, a resin containing an inorganic filler, a ceramic material, or a metal.

[7] The article as described in [6] above, wherein the resin containing an inorganic filler has an inorganic filler content of 0.1 to 100 parts by mass with respect to 100 parts by mass of the resin.

[8] The article as described in [6] or [7] above, wherein the inorganic filler is glass fiber.

Effects of the Invention

The present invention enables provision of a thermoplastic polymer composition which is excellent in flexibility, mechanical properties, moldability, and coloring resistance and which provides excellent adhesion to polar resin, a resin containing an inorganic filler (particularly, glass fiber), ceramic material, glass, or metal, as well as provision of an article formed from the thermoplastic polymer composition.

MODES FOR CARRYING OUT THE INVENTION

Thermoplastic Polymer Composition

The thermoplastic polymer composition of the present invention contains:
100 parts by mass of a hydrogenated block copolymer mixture (a);
0.1 to 100 parts by mass of a polyvinyl acetal (b); and
0.1 to 20 parts by mass of a thermoplastic elastomer (c),
wherein the hydrogenated block copolymer mixture (a) comprises:
a hydrogenated block copolymer (a1) comprising at least one polymer block which has aromatic vinyl compound units (A1) and at least one polymer block which has conjugated diene compound units and which has been hydrogenated (B1) and having a polymer block (A1) content of 5 mass % or higher and lower than 40 mass %, and
a hydrogenated block copolymer (a2) comprising at least one polymer block which has aromatic vinyl compound units (A2) and at least one polymer block which has conjugated diene compound units and which has been hydrogenated (B2) and having a polymer block (A2) content of 40 mass % to 70 mass %;
the polyvinyl acetal (b) has been produced through acetalization of a polyvinyl alcohol having an average polymerization degree of 100 to 4,000 and has an acetalization degree of 55 to 88 mol %; and
the thermoplastic elastomer (c) comprises at least one polymer block which has aromatic vinyl compound units (A3), at least one polymer block which has conjugated diene compound units and which has been hydrogenated (B3), and at least one polymer block having a polar functional group (C).

The components of the composition will next be described in detail.

(Hydrogenated Block Copolymer Mixture (a))

The hydrogenated block copolymer (a1), which is one component of the hydrogenated block copolymer mixture (a), is formed of at least one polymer block which has aromatic vinyl compound units (A1) and at least one polymer block which has conjugated diene compound units and which has been hydrogenated (B1). The hydrogenated block copolymer (a1) has a polymer block (A1) content of 5 mass % or higher and lower than 40 mass %, preferably 10 to 35 mass %, more preferably 15 to 35 mass %, still more preferably 20 to 35 mass %.

The hydrogenated block copolymer (a2), which is the other component of the hydrogenated block copolymer mixture (a), is formed of at least one polymer block which has aromatic vinyl compound units (A2) and at least one polymer block which has conjugated diene compound units and which has been hydrogenated (B2). The hydrogenated block copolymer (a2) has a polymer block (A2) content of 40 mass % to 70 mass %, preferably 45 to 70 mass %, more preferably 50 to 70 mass %, still more preferably 55 to 70 mass %.

Use of the hydrogenated block copolymer mixture (a) composed of two block copolymers; i.e., the hydrogenated block copolymer (a1) and the hydrogenated block copolymer (a2), is a key to attainment of the effects of the present invention, particularly to attainment of improved moldability, coloring resistance, and adhesion of the thermoplastic polymer composition.

In the present invention, the polymer block (A1) content of the hydrogenated block copolymer (a1), and the polymer block (A2) content of the hydrogenated block copolymer (a2) were determined through nuclear magnetic resonance spectrometry ($^1$H-NMR).

Examples of the aromatic vinyl compound forming the aforementioned polymer block (A1) and polymer block (A2) include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene. Of these, styrene, α-methylstyrene, and 4-methylstyrene are preferred. The polymer block (A1) or the polymer block (A2) may be formed of a structural unit derived from a single member or two or more members of the aromatic vinyl compounds.

Each of the polymer block (A1) and the polymer block (A2) may further contain another polymerizable monomer unit, so long as the effects of the present invention are not considerably impaired. Examples of the polymerizable monomer include conjugated diene compounds such as 1,3-butadiene (hereinafter may be referred to simply as "butadiene"), isoprene, 2,3-dimethyl-1,3-butadiene, 1,3-pentadiene, and 1,3-hexadiene.

Each of the polymer block (A1) and the polymer block (A2) preferably has an aromatic vinyl compound unit content of 70 mol % or higher, more preferably 80 mol % or higher, still more preferably 90 mol % or higher, yet more preferably 95 mol % or higher. Particularly preferably, the aromatic vinyl compound unit content is substantially 100 mol %.

Examples of the conjugated diene compound forming the polymer block (B1) of the hydrogenated block copolymer (a1) or the polymer block (B2) of the hydrogenated block copolymer (a2) include butadiene, isoprene, 2,3-dimethyl-1,3-butadiene, 1,3-pentadiene, and 1,3-hexadiene. The polymer block (B1) or the polymer block (B2) may be formed of a structural unit derived from a single member or two or more members of the conjugated diene compounds. Among these conjugated diene compounds forming the polymer block (B1) or the polymer block (B2), isoprene and/or butadiene are/is preferred.

In the case where the polymer block (B1) and/or the polymer block (B2) are/is formed of two or more conjugated diene compounds; for example, butadiene and isoprene, no particular limitation is imposed on the compositional proportions and polymerization mode (e.g., block or random). When the polymer block (B1) and/or the polymer block (B2) are/is formed of butadiene and isoprene, the ratio by mole of butadiene to isoprene is not particularly limited. From the viewpoint of balance between mechanical properties and flexibility, the ratio butadiene/isoprene is preferably 10/90 to 90/10, more preferably 30/70 to 70/30, still more preferably 40/60 to 60/40, particularly preferably 40/60 to 50/50.

No particular limitation is imposed on the bonding mode of the conjugated diene compound forming the polymer block (B1) of the hydrogenated block copolymer (a1) and the polymer block (B2) of the hydrogenated block copolymer (a2). In the case of butadiene, 1,2-bond and/or 1,4-bond may be chosen. In the case of isoprene, one or more modes of 1,2-bond, 3,4-bond, and 1,4-bond may be chosen. When the polymer block (B1) and the polymer block (B2) are predominantly formed of butadiene, isoprene, or isoprene and butadiene, the sum of the 1,2-bond content and the 3,4-bond content of the polymer block (21) and the polymer block (B2) is preferably 1 to 95 mol %, more preferably 1 to 70 mol %, still more preferably 1 to 45 mol %. The lower limit of the sum of the 1,2-bond content and the 3,4-bond content of the polymer block (B1) and the polymer block (B2) is more preferably 3 mol %.

Meanwhile, the 1,2-bond content and the 3,4-bond content may be calculated through $^1$H-NMR measurement. Specifically, the contents may be calculated from integrated values of the peaks attributed to the 1,2-bond unit and the 3,4-bond unit observed at 4.2 to 5.0 ppm and an integrated value of the peak attributed to the 1,4-bond unit observed at 5.0 to 5.45 ppm.

Each of the polymer block (B1) and the polymer block (B2) may further contain another polymerizable monomer, so long as the effects of the present invention are not considerably impaired. Examples of the polymerizable monomer include aromatic vinyl compounds such as styrene, α-methylstyrene, and 4-methylstyrene.

Each of the polymer block (B1) and the polymer block (B2) preferably has a conjugated diene compound unit content of 70 mol % or higher, more preferably 80 mol % or higher, still more preferably 90 mol % or higher, yet more preferably 95 mol % or higher. Particularly preferably, the conjugated diene compound unit content is substantially 100 mol %.

The polymer block (B1) of the hydrogenated block copolymer (a1) and the polymer block (B2) the hydrogenated block copolymer (a2) have been hydrogenated. The percent hydrogenation of the carbon-carbon double bonds originating from the conjugated diene compound units present in the polymer block (B1) or the polymer block (B2) is preferably 80% or higher, more preferably 90% or higher. As used herein, the percent hydrogenation refers to a value obtained from iodine values of the block copolymer determined before and after hydrogenation.

The mode of bonding between the polymer block (A1) and the polymer block (B1) in the hydrogenated block copolymer (a1) and that of the polymer block (A2) and the polymer block (B2) in the hydrogenated block copolymer (a2) may be any of linear, branched, radial, and combinations of two or more of these modes. Among them, the linear bonding mode is preferred. Specific examples include diblock copolymers; i.e., "A-B" type, triblock copolymers; i.e., "A-B-A" type and "B-A-B" type, tetrablock copolymers; i.e., "A-B-A-B" type, pentablock copolymers; i.e., "B-A-B-A-B" type and "A-B-A-B-A" type, "(A-B)nX" type copolymers (wherein X represents a coupling agent residue, and n is an integer of 2 or more), and mixtures thereof, wherein the polymer block (A1) or the polymer block (A2) is represented by "A," and the polymer block (B1) or the polymer block (B2) is represented by "B." Of these, triblock copolymers are preferred, with an "A-B-A" type triblock copolymer being more preferred.

Each of the hydrogenated block copolymer (a1) and the hydrogenated block copolymer (a2) preferably has a weight average molecular weight of 30,000 to 300,000, since the yielded article exhibits excellent dynamic strength. The hydrogenated block copolymer (a1) more preferably has a weight average molecular weight of 100,000 to 300,000 (still more preferably 100,000 to 200,000), and the hydrogenated block copolymer (a2) more preferably has a weight average molecular weight of 30,000 to 100,000 (more preferably 50,000 to 95,000), since the provided thermoplastic polymer composition exhibits excellent moldability. In the present invention, the weight average molecular weight is a weight average molecular weight determined through gel permeation chromatography (GPC) and reduced to a standard polystyrene.

In the hydrogenated block copolymer mixture (a), the ratio by mass of hydrogenated block copolymer (a1) to hydrogenated block copolymer (a2) [(a1)/(a2)] is preferably 99/1 to 50/50, more preferably 97/3 to 60/40, still more preferably 95/5 to 70/30, from the viewpoints of moldability, coloring resistance, and adhesion.

(Method for Producing Hydrogenated Block Copolymers (a1) and (a2))

No particular limitation is imposed on the method for producing the hydrogenated block copolymer (a1) or the hydrogenated block copolymer (a2) employed in the present invention. For example, these copolymers may be produced through anionic polymerization. Specific examples of the production include the following:

method (i) in which the aromatic vinyl compound, the conjugated diene compound, and the aromatic vinyl compound are successively polymerized in the presence of an alkyllithium compound serving as an initiator;

method (ii) the aromatic vinyl compound and the conjugated diene compound are successively polymerized in the presence of an alkyllithium compound serving as an initiator, and coupling is performed by use of a coupling agent; and method (iii) in which the conjugated diene compound and the aromatic vinyl compound are successively polymerized in the presence of a dilithium compound serving as an initiator.

Examples of the alkyllithium compound employed in methods (i) and (ii) above include methyllithium, ethyllithium, n-butyllithium, sec-butyllithium, tert-butyllithium, and pentyllithium. Examples of the coupling agent include dichloromethane, dibromomethane, dichloroethane, dibromoethane, and dibromobenzene. Examples of the dilithium compound employed in method (iii) include naphthalenedilithium and dilithiohexylbenzene.

The amounts of the initiator such as an alkyllithium compound or an dilithium compound and the coupling agent are determined on the basis of the weight average molecular weight of the hydrogenated block copolymer (a1) or the hydrogenated block copolymer (a2) employed in the present invention. Generally, the initiator such as an alkyllithium compound or an dilithium compound is used in an amount of 0.01 to 0.2 parts by mass, with respect to the total amount of the aromatic vinyl compound and the conjugated diene compound undergoing anionic polymerization, which is 100 parts by mass. In method (ii), the coupling agent is generally used in an amount of 0.001 to 0.8 parts by mass, with respect to the total amount of the aromatic vinyl compound and the conjugated diene compound undergoing anionic polymerization, which is 100 parts by mass.

The aforementioned anionic polymerization is preferably performed in the presence of solvent. No particular limitation is imposed on the solvent, so long as it is inert to the initiator and does not adversely affect polymerization. Examples of the solvent include saturated aliphatic hydrocarbons such as hexane, heptane, octane, and decane, and aromatic hydrocarbons such as toluene, benzene, and xylene. In any of the above methods, generally, polymerization is preferably performed at 0 to 80° C. for 0.5 to 50 hours.

In the aforementioned anionic polymerization, an organic Lewis base may be added so as to increase the 1,2-bond content or the 3,4-bond content of the hydrogenated block copolymer (a1) or (a2).

Examples of the organic Lewis base include esters such as ethyl acetate; amines such as triethylamine, N,N,N',N'-tetramethylethylenediamine (TMEDA), and N-methylmorpholine; azo-heterocyclic aromatic compounds such as pyridine; amides such as dimethylacetamide; ethers such as dimethyl ether, diethyl ether, tetrahydrofuran (THF), and dioxane; glycol ethers such as ethylene glycol dimethyl ether and diethylene glycol dimethyl ether; sulfoxides such as dimethylsulfoxide; and ketones such as acetone and methyl ethyl ketone.

After completion of polymerization through the above procedure, a block copolymer contained in the reaction mixture may be poured into a poor solvent to the block copolymer such as methanol, to thereby solidify the polymer. Alternatively, the reaction mixture and steam are fed into hot water, to thereby remove the solvent through co-boiling (i.e., steam stripping), and the solid is dried, to thereby remove an unhydrogenated block copolymer.

Subsequently, the thus-produced block copolymer is hydrogenated, to thereby produce the hydrogenated block copolymer (a1) or the hydrogenated block copolymer (a2).

In one procedure of hydrogenation, the above-produced unhydrogenated block copolymer is dissolved in a solvent which is inert to reaction and the hydrogenation catalyst. In an alternative procedure thereof, the unhydrogenated block copolymer is used without isolating from the reaction mixture and is reacted with hydrogen in the presence of the hydrogenation catalyst.

Examples of the hydrogenation catalyst include Raney nickel; heterogeneous catalysts; i.e., metals such as Pt, Pd, Ru, Rh, and Ni on carriers such as carbon, alumina, diatomaceous earth; Ziegler catalyst; i.e., combination of a transition metal compound with an alkylaluminum compound, an alkyllithium compound, etc.; and metallocene catalysts.

Generally, hydrogenation may be performed at a hydrogen pressure of 0.1 to 20 MPa and a reaction temperature of 20 to 250° C. for a reaction time of 0.1 to 100 hours. The hydrogenation reaction mixture may be poured into a poor solvent such as methanol, to thereby solidify the hydrogenated polymer. Alternatively, the hydrogenation reaction mixture and steam are fed into hot water, to thereby remove the solvent through co-boiling (i.e., steam stripping), and the solid is dried, to thereby isolate the hydrogenated block copolymer (a1) or the hydrogenated block copolymer (a2).

(Polyvinyl Acetal (b))

The polyvinyl acetal (b) employed in the present invention is generally a resin having structural units represented by the following formula (I).

[F1]

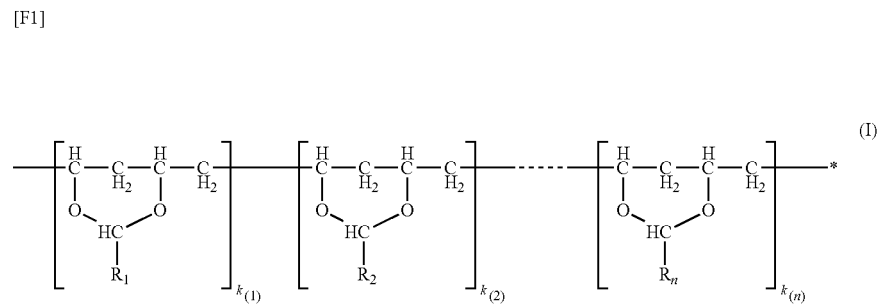

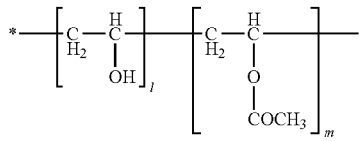
-continued

In formula (I), n is the number of aldehydes used in the acetalization reaction; $R_1$, $R_2$, to $R_n$ each represent an alkyl residue of the aldehyde used in acetalization or a hydrogen atom; $k_{(1)}$, $k_{(2)}$, to $k_{(n)}$ each represent the proportion of [structural unit] (mole ratio); l represents the vinyl alcohol unit proportion (mole ratio); and m represents the vinyl acetate unit proportion (mole ratio).

However, $k_{(1)}+k_{(2)}+ \ldots +k_{(n)}+l+m$ may be 1, and any of $k_{(1)}$, $k_{(2)}$, ..., $k_{(n)}$, l, and m may be 0.

No particular limitation is imposed on the sequence of the repeating units. Other than the above sequence, a random sequence, a block sequence, and a taper-like sequence may also be employed.

(Method for Producing Polyvinyl Acetal (b))

The polyvinyl acetal (b) may be produced through, for example, reaction between polyvinyl alcohol and aldehyde.

Generally, the polyvinyl alcohol used for producing polyvinyl acetal (b) preferably has an average polymerization degree of 100 to 4,000, more preferably 100 to 3,000, still more preferably 100 to 2,000. When the average polymerization degree of the polyvinyl alcohol is 100 or higher, production and handling of polyvinyl acetal (b) are easy, whereas when the average polymerization degree of the polyvinyl alcohol is 4,000 or less, excessive rise in melt viscosity during melt kneading is prevented, whereby the thermoplastic polymer composition of the present invention can be readily produced. In the present invention, the average polymerization degree of polyvinyl alcohol may be determined according to JIS K 6726. Specifically, the procedure includes re-saponification of polyvinyl alcohol, purification, and measuring the intrinsic viscosity in water at 30° C.

No particular limitation is imposed on the method for producing polyvinyl alcohol. For example, the polyvinyl alcohol used in the invention may be produced through saponification of polyvinyl acetate or the like with an alkali, an acid, ammonia, etc. The polyvinyl alcohol may be completely saponified or partially saponified. The saponification degree of polyvinyl alcohol is preferably 80 mol % or higher, more preferably 90 mol % or higher, still more preferably 95 mol % or higher.

The polyvinyl alcohol may be a copolymer of vinyl alcohol and a monomer which can be polymerized with vinyl alcohol. Examples of the copolymer include ethylene-vinyl alcohol copolymer and partially saponified ethylene-vinyl alcohol copolymer. Alternatively, a modified polyvinyl alcohol partially having a carboxylic acid-containing unit may also be employed. These polyvinyl alcohol species may be used singly or in combination of two or more species.

No particular limitation is imposed on the aldehyde used for producing polyvinyl acetal (b). Examples of the aldehyde include formaldehyde (including paraformaldehyde), acetaldehyde (including paraacetaldehyde), propionaldehyde, n-butylaldehyde, isobutylaldehyde, pentanal, hexanal, heptanal, n-octanal, 2-ethylhexylaldehyde, cyclohexanecarbaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. These aldehydes may be used singly or in combination of two or more species. Among these aldehydes, butylaldehyde is preferred from the viewpoint of easy production, with n-butylaldehyde being more preferred.

When the polyvinyl acetal (b) is produced through acetalization with butylaldehyde, the product is called polyvinyl butyral (PVB).

In the present invention, the butyral unit content of the polyvinyl acetal (b), with respect to all acetal units (see the following equation), is preferably 0.9 or higher, more preferably 0.95 or higher. That is, in the structure of the polyvinyl acetal (b) represented by formula (I), when only $R_1$ is $C_3H_7$ (residue of butylaldehyde), the polyvinyl acetal (b) preferably satisfies the condition: $0.9 \leq k_{(1)}/(k_{(1)}+k_{(2)}+ \ldots +k_{(n)})$.

The percent acetalization of the polyvinyl acetal (b) employed in the present invention is preferably 55 to 88 mol %. When the percent acetalization thereof is 55 mol % or higher, the polyvinyl acetal (b) can be produced at low cost with high availability and has excellent melt processability, whereas when the percent acetalization is 88 mol % or lower, the polyvinyl acetal (b) can be remarkably readily produced. In this case, acetalization can be completed for a short period of time, which is economically advantageous. The percent acetalization of the polyvinyl acetal (b) is more preferably 60 to 88 mol %, still more preferably 70 to 87 mol %, particularly preferably 75 to 85 mol %. As the percent acetalization of the polyvinyl acetal (b) is low, the hydroxyl group content of the polyvinyl acetal (b) increases, which is advantageous for adhesion to glass. Through controlling the percent acetalization to fall within the aforementioned range, the polyvinyl acetal (b) has higher affinity and compatibility to the hydrogenated block copolymer (a1) and the hydrogenated block copolymer (a2), whereby the thermoplastic polymer composition has enhanced mechanical properties and exhibits high adhesion strength to polar resin, resin containing inorganic filler (particularly, glass fiber), ceramic material, glass, or metal.

The percent acetalization (mol %) of polyvinyl acetal (b) is defined by the following equation:

Percent acetalization (mol %)=$\{k_{(1)}+k_{(2)}+ \ldots +k_{(n)}\} \times 2/\{\{k_{(1)}+k_{(2)}+ \ldots +k_{(n)}\} \times 2+l+m\} \times 100$ (wherein n, $k_{(1)}$, $k_{(2)}$, ..., $k_{(n)}$, l, and m have the same meanings as defined above).

The percent acetalization of the polyvinyl acetal (b) may be determined in accordance with the method described in JIS K 6728 (1977). Specifically, the vinyl alcohol unit content by mass ($l_0$) and the vinyl acetate unit content by mass ($m_0$) are determined through titration, and the vinyl acetal unit content by mass ($k_0$) is calculated by $k_0=1-l_0-m_0$. Then, the vinyl alcohol unit content by mole l ($l=(l_0/44.1)/(l_0/44.1+m_0/86.1+2k_0/Mw\,(acetal))$) and the vinyl acetate unit content by mole m ($m=(m_0/86.1)/(l_0/44.1+m_0/86.1+k_0/Mw\,(acetal))$) are calculated, and the vinyl acetal unit content by mole ($k=k_{(1)}+k_{(2)}+ \ldots +k_{(n)}$) is calculated by $k=1-l-m$. The Mw (acetal) is a molecular weight of a single vinyl acetal unit. For example, in the case of polyvinyl butyral, Mw (acetal) is equal to Mw (butyral), which is 142.2. Then, the percent acetalization (mol %) can be calculated by the equation: $\{k_{(1)}+k_{(2)}+ \ldots +k_{(n)}\} \times 2/\{\{k_{(1)}+k_{(2)}+ \ldots +k_{(n)}\} \times 2+l+m\} \times 100$.

The percent acetalization of the polyvinyl acetal (b) may be calculated through $^1$H-NMR or $^{13}$C-NMR by use of a sample of the polyvinyl acetal (b) dissolved in an appropriate deuteration solvent such as deuterated dimethyl sulfoxide.

The polyvinyl acetal (b) preferably has a vinyl alcohol unit content of 17 to 45 mol % (0.17≤l≤0.45) and a vinyl acetate unit content of 0 to 5 mol % (0≤m≤0.05), more preferably 0 to 3 mol % (0≤m≤0.03).

The reaction between polyvinyl alcohol and an aldehyde (acetalization) may be performed through a known method. One mode of acetalization reaction is an aqueous medium method, in which an aqueous solution of polyvinyl alcohol and an aldehyde undergo acetalization in the presence of an acid catalyst, to thereby precipitate particles of the polyvinyl acetal (b). Another mode of acetalization reaction is a solvent method, in which polyvinyl alcohol is dispersed in an organic solvent, the dispersion is acetalized with an aldehyde in the presence of an acid catalyst, and the thus-obtained reaction mixture is mixed with a poor solvent to polyvinyl acetal (b) such as water, to thereby precipitate particles of the polyvinyl acetal (b).

No particular limitation is imposed on the acid catalyst. Examples of the acid catalyst include organic acids such as acetic acid and p-toluenesulfonic acid; inorganic acids such as nitric acid, sulfuric acid, and hydrochloric acid; a gas exhibits acidity when dissolved in water such as carbon dioxide; cation-exchange resin, and solid acid catalysts such as metal oxides.

Generally, the slurry formed by the aforementioned aqueous medium method or solvent method assumes an acidic slurry due to the acid catalyst. One method for removing the acid catalyst includes repeatedly washing the slurry with water, to thereby adjust the pH preferably to 5 to 9, more preferably 6 to 9, still more preferably 6 to 8. Another method for removing the acid catalyst include adding a neutralization agent to the slurry, to thereby adjust the pH preferably to 5 to 9, more preferably 6 to 9, still more preferably 6 to 8. Yet another method for removing the acid catalyst includes adding an alkylene oxide to the slurry.

Examples of the compound for adjusting the pH include alkali metal hydroxides such as sodium hydroxide and potassium hydroxide; alkali metal acetates such as sodium acetate; alkali metal carbonate such as sodium carbonate and potassium carbonate; alkali metal hydrogencarbonates such as sodium hydrogencarbonate; ammonia; and aqueous ammonia. Examples of the alklylene oxide include ethylene oxide; propylene oxide; and glycidyl ethers such as ethylene glycol diglycidyl ether.

Subsequently, the salt formed by neutralization, aldehyde reaction residue, etc. are removed.

No particular limitation is imposed on the removal method, and a customary method such as repetition of washing and dehydration may be generally employed. The polyvinyl acetal (b) containing water from which residues, etc. are removed is dried in accordance with needs, and formed into powder, granules, or pellets, if needed. Preferably, the polyvinyl acetal (b) employed in the present invention is degassed under reduced pressure during forming into powder, granules, or pellets, whereby the amounts of aldehyde reaction residues and water are reduced.

The thermoplastic polymer composition of the present invention contains a polyvinyl acetal (b) in an amount of 0.1 to 100 parts by mass, with respect to 100 parts by mass of the hydrogenated block copolymer mixture (a). When the polyvinyl acetal (b) content is less than 0.1 parts by mass, sufficient adhesion to polar resin, resin containing inorganic filler (particularly, glass fiber), ceramic material, glass, or metal is difficult to attain. The polyvinyl acetal (b) content, with respect to 100 parts by mass of the hydrogenated block copolymer mixture (a), is preferably 1 part by mass or higher, more preferably 5 parts by mass or higher, still more preferably 10 parts by mass or higher, particularly preferably 15 parts by mass or higher. In contrast, when the polyvinyl acetal (b) is in excess of 100 parts by mass, the thermoplastic polymer composition becomes hard, possibly failing to attain excellent flexibility and mechanical properties. The polyvinyl acetal (b) content, with respect to 100 parts by mass of the hydrogenated block copolymer mixture (a), is preferably 70 parts by mass or lower, more preferably 50 parts by mass or lower, still more preferably 40 parts by mass or lower. Accordingly, the polyvinyl acetal (b) content, with respect to 100 parts by mass of the hydrogenated block copolymer mixture (a), is preferably 5 to 100 parts by mass, more preferably 5 to 70 parts by mass, still more preferably 10 to 70 parts by mass, yet more preferably 10 to 50 parts by mass, further more preferably 15 to 40 parts by mass.

(Thermoplastic Elastomer (c))

The thermoplastic elastomer (c) is formed of at least one polymer block which has aromatic vinyl compound units (A3), at least one polymer block which has conjugated diene compound units and which has been hydrogenated (B3), and at least one polymer block having a polar functional group (C). The thermoplastic elastomer (c) preferably has a polymer block (A3) content of 5 to 50 mass %, more preferably 10 to 40 mass %, still more preferably 15 to 35 mass %, particularly preferably 20 to 35 mass %.

In the present invention, the polymer block (A3) content of the thermoplastic elastomer (c) was determined through nuclear magnetic resonance spectrometry ($^1$H-NMR).

Examples of the aromatic vinyl compound forming the aforementioned polymer block (A3) of the thermoplastic elastomer (c) include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene. Of these, styrene, α-methylstyrene, and 4-methylstyrene are preferred. The polymer block (A3) may be formed of a structural unit derived from a single member or two or more members of the aromatic vinyl compounds.

The polymer block (A3) may further contain another polymerizable monomer unit, so long as the effects of the present invention are not considerably impaired. Examples of the polymerizable monomer include conjugated diene compounds such as butadiene, isoprene, 2,3-dimethyl-1,3-butadiene, 1,3-pentadiene, and 1,3-hexadiene. The polymer block (A3) preferably has an aromatic vinyl compound unit content of 70 mol % or higher, more preferably 80 mol % or higher, still more preferably 90 mol % or higher, yet more preferably 95 mol % or higher. Particularly preferably, the aromatic vinyl compound unit content is substantially 100 mol %.

Examples of the conjugated diene compound forming the polymer block hydrogenated and having conjugated diene compound units (B3) of the thermoplastic elastomer (c) include butadiene, isoprene, 2,3-dimethyl-1,3-butadiene, 1,3-pentadiene, and 1,3-hexadiene. The polymer block (B3) may be formed of a structural unit derived from a single member or two or more members of the conjugated diene compounds. Among these conjugated diene compounds forming the polymer block (B3), isoprene and/or butadiene are/is preferred.

In the case where the polymer block (B3) is formed of two or more conjugated diene compounds; for example, butadiene and isoprene, no particular limitation is imposed on the compositional proportions and polymerization mode (e.g., block or random). When the polymer block (B3) is formed of butadiene and isoprene, the ratio by mole of butadiene to isoprene is not particularly limited. From the viewpoint of balance between mechanical properties and flexibility, the ratio butadiene/isoprene is preferably 10/90 to 90/10, more preferably 30/70 to 70/30, still more preferably 40/60 to 60/40, particularly preferably 40/60 to 50/50.

No particular limitation is imposed on the bonding mode of the conjugated diene compound forming the polymer block hydrogenated and having conjugated diene compound units (B3) of the thermoplastic elastomer (c). In the case of butadiene, 1,2-bond and/or 1,4-bond may be chosen. In the case of isoprene, one or more modes of 1,2-bond, 3,4-bond, and 1,4-bond may be chosen. When the polymer block (B3) is predominantly formed of butadiene, isoprene, or isoprene and butadiene, the sum of the 1,2-bond content and the 3,4-bond content of the polymer block (B3) is preferably 1 to 95 mol %, more preferably 1 to 70 mol %, still more preferably 1 to 45 mol %.

The polymer block (B3) may further contain another polymerizable monomer, so long as the effects of the present invention are not considerably impaired. Examples of the polymerizable monomer include styrene, α-methylstyrene, and 4-methylstyrene. The polymer block (B3) preferably has a conjugated diene compound unit content of 70 mol % or higher, more preferably 80 mol % or higher, still more preferably 90 mol % or higher, yet more preferably 95 mol % or higher. Particularly preferably, the conjugated diene compound unit content is substantially 100 mol %.

The polymer block having conjugated diene compound units (B3) of the thermoplastic elastomer (c) has been hydrogenated. The percent hydrogenation of the carbon-carbon double bonds originating from the conjugated diene compound units present in the polymer block (B3) is preferably 80% or higher, more preferably 90% or higher.

The mode of bonding between the polymer block (A3) and the polymer block (B3) in the thermoplastic elastomer (c) may be any of linear, branched, radial, and combinations of two or more of these modes. Among them, the linear bonding mode is preferred. Specific examples include diblock copolymers; i.e., "A-B" type, triblock copolymers; i.e., "A-B-A" type and "B-A-B" type, tetrablock copolymers; i.e., "A-B-A-B" type, pentablock copolymers; i.e., "B-A-B-A-B" type and "A-B-A-B-A" type, "(A-B)nX" type copolymers (wherein X represents a coupling agent residue, and n is an integer of 2 or more), and mixtures thereof, wherein the polymer block (A3) is represented by "A," and the polymer block (B3) is represented by "B." Of these, triblock copolymers are preferred, with an "A-B-A" type triblock copolymer being more preferred.

The polymer block (C) is a polymer block having a polar functional group. Examples of the polymer block (C) include condensation polymer blocks such as polyester block, polyamide block, polyurethane block, polycarbonate block, polyurea block, and polyacetal block; vinyl polymer blocks such as polyvinyl alcohol, polyvinyl acetal, ethylene-vinyl alcohol copolymer, polyvinyl acetate, ethylene-vinyl acetate copolymer, propylene-vinyl alcohol copolymer, polyhydroxystyrene, sulfonated polystyrene, and polyvinylpyridine; acrylic polymer blocks and copolymers of two or more acrylic monomers such as polymethyl (meth)acrylate, polyethyl (meth)acrylate, polypropyl (meth)acrylate, polyisopropyl (meth)acrylate, poly-n-butyl (meth)acrylate, poly-sec-butyl (meth)acrylate, poly-tert-butyl (meth)acrylate, polypentyl (meth)acrylate, polyhexyl (meth)acrylate, polyoctyl (meth)acrylate, poly-2-ethylhexyl (meth)acrylate, polydodecyl (meth)acrylate, polymyristyl (meth)acrylate, polypalmityl (meth)acrylate, polystearyl (meth)acrylate, polybehenyl (meth)acrylate, polycyclohexyl (meth)acrylate, polyphenyl (meth)acrylate, polyhydroxymethyl (meth)acrylate, polyhydroxyethyl (meth)acrylate, polyhydroxyethoxyethyl (meth)acrylate, and poly(meth)acrylic acid; ethylene copolymer-based acrylic polymer blocks produced through copolymerization of the monomers forming the acrylic polymers with an ethylenic monomer; and addition polymerization polymer blocks such as polyketone and polyethylene oxide.

Of these, the polymer block (C) is preferably a polyurethane block, from the viewpoints of compatibility to the polyvinyl acetal (b) and other factors.

(Method for Producing Thermoplastic Elastomer (c))

No particular limitation is imposed on the method for producing the thermoplastic elastomer (c). In one preferred embodiment, a thermoplastic polyurethane elastomer forming a polyurethane block as the polymer block (C) and an end-modified hydrogenated block copolymer (x) containing at least one polymer block (A3) and at least one polymer block (B3) and having a functional group (preferably a hydroxyl group) at an end thereof were kneaded under melt conditions. A thermoplastic elastomer (c) of interest can be isolated from the reaction product through a known technique.

The thermoplastic polyurethane elastomer and the end-modified hydrogenated block copolymer (x) may be melt-kneaded by means of a known melt-kneader such as a single-screw extruder, a twin-screw extruder, a kneader, or a Bunbury mixer. Melt-kneading conditions may be modified in accordance with the types of the thermoplastic polyurethane elastomer and the end-modified hydrogenated block copolymer (x) employed, the type of kneader, etc. Preferably, melt-kneading is performed at about 180 to about 250° C. for about 1 to about 15 minutes.

Since the produced thermoplastic polymer composition can be endowed with excellent mechanical properties and adhesion, the thermoplastic elastomer (c) preferably has a melt viscosity of 1 to 30 kPa·s, more preferably 3 to 20 kPa·s. Also, since the produced thermoplastic polymer composition can exhibit excellent moldability and coloring resistance, the end-modified hydrogenated block copolymer (x) forming the thermoplastic elastomer (c) preferably has a weight average molecular weight of 30,000 to 300,000, more preferably 50,000 to 250,000.

Alternatively, the aforementioned thermoplastic elastomer (c) may also be produced through adding the end-modified hydrogenated block copolymer (x) to the reaction system before or during reaction for producing the thermoplastic polyurethane elastomer, allowing the mixture to react, and isolating the target product through a known method.

In other words, an unreacted thermoplastic polyurethane elastomer present in the produced thermoplastic elastomer (c) may be removed through subjecting the formed reaction mixture to extraction with dimethylformamide or the like. Subsequently, the unreacted end-modified hydrogenated block copolymer (x) may be removed through extraction of the reaction mixture with cyclohexane or the like, whereby the thermoplastic elastomer (c) as a target product can be isolated. Notably, the aforementioned thermoplastic elastomer (c) may contain an unreacted thermoplastic polyurethane elastomer and the unreacted end-modified hydrogenated block copolymer (x), involved in the above production.

The aforementioned thermoplastic polyurethane elastomer may be produced by reacting a polymer diol, an organic diisocyanate, and a chain-extender through kneading them by means of a kneader.

Examples of the polymer diol include polyether polyol and polyester polyol.

Examples of the polyether polyol include polyether diols produced through ring-opening polymerization of a cyclic ether (e.g., ethylene oxide, propylene oxide, trimethylene oxide, tetrahydrofuran, or methyltetrahydrofuran), and polyether polyols produced through polycondensation of a glycol (e.g., ethylene glycol, propylene glycol, 1,4-butanediol, neopentyl glycol, 1,6-hexanediol, 3-methyl-1,5-pentanediol, 2-methyl-1,8-octanediol, 1,9-nonanediol, or 1,10-decandiol).

Examples of the polyester polyol include polyester polyols produced from a polycarboxylic acid, a polyol, and optional components through a known polycondensation process based on esterification or transesterification. No particular limitation is imposed on the polyol, and any polyol generally employed in production of polyester may be used. Examples of the polyol include C2 to C15 aliphatic diols such as ethylene glycol, diethylene glycol, triethylene glycol, propylene glycol, 1,3-propanediol, 2-methyl-1,3-propanediol, 2,2-diethyl-1,3-propanediol, 1,4-butanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, and 2,8-dimethyl-1,9-nonanediol; alicyclic diols such as 1,4-cyclohexanediol, cyclohexanedimethanol, and cyclooctanedimethanol; diols having two hydroxyl groups in the molecule thereof such as aromatic divalent alcohols; e.g., 1,4-bis($\beta$-hydroxyethoxy)benzene; and polyols having three or more hydroxyl groups in the molecule thereof such as trimethylolpropane, trimethylolethane, glycerin, 1,2,6-hexanetriol, pentaerythritol, and diglycerin. Also, no particular limitation is imposed on the polycarboxylic acid, and any polycarboxylic acid generally employed in production of polyester may be used. Examples of the polycarboxylic acid include C4 to C12 aliphatic dicarboxylic acids such as succinic acid, glutaric acid, adipic acid, suberic acid, azelaic acid, sebacic acid, dodecanedioic acid, methylsuccinic acid, 2-methylglutaric acid, and trimethyladipic acid; alicyclic dicarboxylic acids such as cyclohexanedicarboxylic acid, dimeric acid, and hydrogenated dimeric acid; aromatic dicarboxylic acids such as terephthalic acid, isophthalic acid, orthophthalic acid, and naphthalenedicarboxylic acid; and polycarboxylic acids having three or more functions such as trimellitic acid and pyromellitic acid.

Examples of the organic diisocyanate include aliphatic diisocyanates such as tetramethylene diisocyanate, hexamethylene diisocyanate (HDI), trimethylhexamethylene diisocyanate (TMDI), and lysine diisocyanate (LDI); alicyclic diisocyanate such as cyclohexane-1,4-diisocyanate, isophorone diisocyanate (IPDI), hydrogenated xylylene diisocyanate, and hydrogenated bis(isocyanatophenyl)methane; and aromatic diisocyanates such as phenylene diisocyanate, tolylene diisocyanate (TDI), xylylene diisocyanate (XDI), tetramethylxylylene diisocyanate (TMXDI), naphthalene diisocyanate (NDI), bis(isocyanatophenyl)methane (MDI), toluidine diisocyanate (TODI), and 1,3-bis(isocyanatophenyl)propane.

The chain-extender may be selected from chain extenders generally employed in production of thermoplastic polyurethane, and a low-molecular-weight compound having two or more active hydrogen atoms which can react with an isocyanate group in the molecule thereof and a molecular weight of 300 or lower. Examples of the low-molecular-weight compound include aliphatic or alicyclic diols such as ethylene glycol, propylene glycol, 1,4-butanediol, 1,6-hexanediol, 1,4-bis($\beta$-hydroxyethoxy)benzene, 1,4-cyclohexanediol, bis($\beta$-hydroxyethyl) terephthalate, and xylylene glycol; diamines such as ethylenediamine, propylenediamine, xylylenediamine, isophoronediamine, piperazine or a derivative thereof, phenylenediamine, tolylenediamine, and xylenediamine; and aminoalcohols such as aminoethyl alcohol and aminopropyl alcohol.

The aforementioned end-modified hydrogenated block copolymer (x) may be produced through a known method. In one exemplary method, a molecular chain of a block copolymer is formed through ionic polymerization such as anionic polymerization or cationic polymerization, single-site polymerization, living radical polymerization, or the like, and a hydroxyl group is added to an end of the molecular chain, followed by hydrogenation through a known technique.

In the case of anionic polymerization, an aromatic vinyl compound and a conjugated diene compound are successively polymerized in an inert organic solvent such as n-hexane or cyclohexane in the presence of a polymerization initiator such as an alkyllithium compound. When a molecular structure and a molecular weight of interest are attained, an oxirane compound such as ethylene oxide, propylene oxide, or styrene oxide, or a lactone compound such as $\epsilon$-caprolactone, $\beta$-propiolactone, or dimethylpropiolactone (pyvalolactone) is added. Subsequently, an active hydrogen compound such as an alcohol, a carboxylic acid, or water is added to terminate polymerization, whereby a block copolymer having a hydroxyl group at an end can be produced. The number of hydroxyl groups contained in one molecule of the block copolymer is evaluated by an average hydroxyl group value. The average hydroxyl group value is preferably 0.5 or higher, more preferably 0.7 or higher.

As used herein the term "average hydroxyl group value" refers to a ratio of the amount by mole of end hydroxyl groups to that of initiator ends, wherein the amount by mole of end hydroxyl groups is calculated from the integrated value of hydrogen atoms bonded to the carbon atom adjacent to the end hydroxyl group, and the amount by mole of initiator ends is calculated from the integrated value of hydrogen atoms originating from the initiator end, these integrated values being obtained through $^1$H-NMR measurement of the end-modified hydrogenated block copolymer (x).

Subsequently, the thus-produced block copolymer having a hydroxyl group at an end is hydrogenated, to thereby produce the end-modified hydrogenated block copolymer (x). In hydrogenation, the above-produced block copolymer having a hydroxyl group at an end is dissolved in a solvent which is inert to reaction and the hydrogenation catalyst. In an alternative procedure thereof, the above-produced block copolymer having a hydroxyl group at an end is used without isolating from the reaction mixture and is reacted with hydrogen in the presence of the hydrogenation catalyst. Generally, hydrogenation may be performed at a hydrogen pressure of 0.1 to 20 MPa and a reaction temperature of 20 to 250° C. for 0.1 to 100 hours. The hydrogenation reaction mixture obtained by hydrogenation may be poured into a poor solvent such as methanol, to thereby solidify the hydrogenated polymer. Alternatively, the hydrogenation reaction mixture and steam are fed into hot water, to thereby remove the solvent through co-boiling (i.e., steam stripping), and the solid is dried, to thereby isolate the end-modified hydrogenated block copolymer (x). Notably, in some cases, the end-modified hydrogenated block copolymer (x) may contain a hydrogenated block copolymer having no end functional group, which is involved in the above production. In such cases, the block copolymer (x) may be employed as a raw material of the thermoplastic elastomer (c). The hydrogenated block copolymer having no end functional group is not directly used for producing the thermoplastic elastomer (c), and as mentioned above, is removed in isolating the thermoplastic elastomer (c).

The thermoplastic polymer composition of the present invention contains the thermoplastic elastomer (c) in an amount of 0.1 to 20 parts by mass, with respect to 100 parts by mass of the hydrogenated block copolymer mixture (a). When the thermoplastic elastomer (c) content is lower than 0.1 parts by mass, the produced thermoplastic polymer composition tends to provide insufficient adhesion. Although the reason for this has not been clearly elucidated, one conceivable reason is as follow. That is, the hydrogenated block copolymer (a1) and the hydrogenated block copolymer (a2) in the hydrogenated block copolymer mixture (a) have poor compatibility to the polyvinyl acetal (b). Thus, when the thermoplastic elastomer (c) content is excessively low, the article produced from the thermoplastic polymer composition has an undesirable skin layer around the surface thereof, or problematic delamination of the article occurs. Therefore, the thermoplastic elastomer (c) content, with respect to 100 parts by mass of the hydrogenated block copolymer mixture (a), is preferably 0.5 parts by mass or higher, more preferably 1 part by mass or higher. In contrast, when the thermoplastic elastomer (c) content is in excess of 20 parts by mass, mechanical properties, coloring resistance, and moldability are poor. Thus, the thermoplastic elastomer (c) content, with respect to 100 parts by mass of the hydrogenated block copolymer mixture (a), is preferably 17 parts by mass or lower, more preferably 15 parts by mass or lower. Accordingly, the thermoplastic elastomer (c) content, with respect to 100 parts by mass of the hydrogenated block copolymer mixture (a), is preferably 0.5 to 20 parts by mass, more preferably 1 to 20 parts by mass, still more preferably, 1 to 17 parts by mass, particularly preferably 1 to 15 parts by mass.

(Softener (d))

The thermoplastic polymer composition of the present invention may further contain a softener (d), for providing the composition with moldability and flexibility and for other purposes. When the thermoplastic polymer composition contains the softener (d), the softener (d) content, with respect to 100 parts by mass of the hydrogenated block copolymer mixture (a), is preferably 0.1 to 300 parts by mass, more preferably 5 to 200 parts by mass, still more preferably 50 to 150 parts by mass.

No particular limitation is imposed on the softener (d), and softeners generally employed in rubbers and plastics may be used. Examples of the softener (d) include process oils such as paraffin process oil, naphthene process oil, and aromatic process oil; phthalic acid derivatives such as dioctyl phthalate and dibutyl phthalate; and other softeners such as white oil, mineral oil, ethylene-α-olefin oligomer, paraffin wax, liquid paraffin, polybutene, low-molecular-weight polybutadiene, and low-molecular-weight polyisoprene. Of these, process oil is preferred, with paraffin process oil being more preferred.

Also, softeners which are known to be generally employed in polyvinyl acetal may be used. Examples of such softeners include organic acid ester plasticizers such as a monobasic organic acid ester and a polybasic organic acid ester; and phosphoric acid plasticizers such as an organic phosphoric acid plasticizer and an organic phosphrous acid plasticizer. Examples of the monobasic organic acid ester plasticizer include glycol-based esters produced through reaction between a glycol such as triethylene glycol, tetraethylene glycol, or tripropylene glycol and a monobasic organic acid such as butyric acid, isobutyric acid, caproic acid, 2-ethylbutyric acid, heptylic acid, n-octylic acid, 2-ethylhexylic acid, pelargonic acid (n-nonylic acid), or decylic acid, and typical examples thereof include triethylene glycol dicaproate, triethylene glycol di-2-ethylbutyrate, triethylene glycol di-n-octylate, and triethylene glycol di-2-ethylhexylate. Examples of the polybasic organic acid ester plasticizer include esters produced from a polybasic organic acid such as adipic acid, sebacic acid, or azelaic acid and a linear or branched alcohol, and typical examples thereof include dibutyl sebacate, dioctylazelate, and dibutylcarbitol adipate. Examples of the organic phosphoric acid plasticizer include tributoxyethyl phosphate, isodecyl phenyl phosphate, and triisopropyl phosphate. These softeners (d) may be used singly or in combination of two or more species.

(Other Components)

So long as the effects of the present invention are not impaired, the thermoplastic polymer composition of the present invention may further contain, in accordance with needs, a thermoplastic polymer such as a olefin polymer, a styrene polymer, a polyphenylene ether resin, and a polyethylene glycol. Particularly when the composition contains an olefin polymer, processability and mechanical properties can be further enhanced. Examples of the olefin polymer include polyethylene, polypropylene, polybutene, and block copolymers and random copolymers such as propylene-α olefin; e.g., ethylene or 1-butene, copolymers. These olefin polymers may be used singly or in combination of two or more species.

When the thermoplastic polymer composition contains any of the thermoplastic polymers, the thermoplastic polymer content, with respect to 100 parts by mass of the hydrogenated block copolymer mixture (a), is preferably 100 parts by mass or lower, more preferably 50 parts by mass or lower, still more preferably 30 parts by mass or lower.

If needed, the thermoplastic polymer composition of the present invention may further contains an inorganic filler. The inorganic filler is a useful material for improving the physical properties including heat resistance and weather resistance of the thermoplastic polymer composition of the present invention, adjusting hardness, and serving as a low-cost chain extender. No particular limitation is imposed on the inorganic filler, and examples include calcium carbonate, talc, magnesium hydroxide, aluminum hydroxide, mica, clay, naturally occurring silicic acid, synthetic silicic acid, titanium oxide, carbon black, barium sulfate, glass balloon, and glass fiber. These inorganic fillers may be used singly or in combination of two or more species. When the thermoplastic polymer composition contains an inorganic filler, the inorganic filler content preferably falls within a range in which the flexibility of the thermoplastic polymer composition is not impaired. Generally, the inorganic filler content, with respect to 100 parts by mass of the hydrogenated block copolymer mixture (a), is preferably 100 parts by mass or lower, more preferably 70 parts by mass or lower, still more preferably 50 parts by mass or lower.

The thermoplastic polymer composition of the present invention may further contain a tackifier, so long as the effects of the present invention are not considerably impaired. Examples of the tackifier include rosin-based resin, terpene-phenolic resin, terpene resin, aromatic hydrocarbon-modified terpene resin, aliphatic petroleum resin, alicyclic petroleum resin, aromatic petroleum resin, coumarone-indene resin, phenolic resin, and xylene resin. In the case where the thermoplastic polymer composition contains a tackifier, the tackifier content preferably falls within a range in which the mechanical properties of the thermoplastic polymer composition are not impaired. Generally, the tackifier content, with respect to 100 parts by mass of the hydrogenated block copolymer mixture (a), is preferably 100 parts by mass or lower, more preferably 70 parts by mass or lower.

If needed, the thermoplastic polymer composition of the present invention may further contain additives, so long as the effects of the present invention are not considerably impaired. Examples of such additives include an anti-oxidant, a lubricant, a photo-stabilizer, a processing aid, a colorant such as a pigment or a dye, a flame retardant, an anti-static agent, a matting agent, silicone oil, an anti-blocking agent, a UV-absorber, a mold-releasing agent, a foaming agent, an anti-bacterial agent, an anti-fungal agent, and a perfume. These additive may be used singly or in combination of two or more species. Examples of the anti-oxidant include a hindered phenol anti-oxidant, a phosphorus-containing anti-oxidant, a lactone anti-oxidant, and a hydroxyl anti-oxidant. Of these, a hindered phenol anti-oxidant is preferred. When the thermoplastic polymer composition contains an anti-oxidant, the oxidant content, with respect to 100 parts by mass of the hydrogenated block copolymer mixture (a), is preferably 0.1 to 5 parts by mass, from the viewpoint of the coloring resistance of the thermoplastic polymer composition.

No particular limitation is imposed on the method for producing the thermoplastic polymer composition of the present invention, and any method may be employed so long as the components of the thermoplastic polymer composition of the present invention can be uniformly mixed. Generally, melt kneading is employed. Melt kneading may be carried out by means of a melt-kneader such as a single-screw extruder, a twin-screw extruder, a kneader, a batch mixer, a roller, or a Bunbury mixer. Generally, the components may be melt-kneaded at 170 to 270° C., to thereby produce the thermoplastic polymer composition of the present invention.

The thus-produced thermoplastic polymer composition of the present invention preferably has Shore A hardness of 93 or lower, more preferably 85 or lower, still more preferably 75 or lower. When the Shore A hardness is 93 or less, excellent flexibility, elasticity, and mechanical properties can be readily attained, and the thermoplastic polymer composition which can provide excellent adhesion to polar resin, resin containing inorganic filler (particularly, glass fiber), ceramic material, glass, or metal is suitably used. The Shore A hardness of the thermoplastic polymer composition refers to a hardness of a sheet having a thickness of 6 mm made by laminating sheets of the thermoplastic polymer composition of the present invention which hardness is measured by means of a type A durometer described in JIS K 6253.

Since the thermoplastic polymer composition of the present invention has excellent moldability, a variety of articles, sheets, and films can be produced therefrom. In this case, the molding method may be a method generally employed with respect to thermoplastic polymer compositions. Examples of the employable molding method include injection molding, extrusion molding, press molding, blow molding, calendar molding, and casting. Molding methods generally employed for forming film and sheet such as T-die method, calendar method, inflation method, and belt method may also be employed.

The thermoplastic polymer composition of the present invention is excellent in flexibility, mechanical properties, moldability, and coloring resistance, and provides excellent adhesion to polar resin, resin containing inorganic filler (particularly, glass fiber), ceramic material, glass, or metal. Therefore, one preferred embodiment of the article produced from thermoplastic polymer composition of the present invention is an article in which the thermoplastic polymer composition adhered to (a) polar resin, (b) resin containing an inorganic filler, (c) ceramic material, (d) glass, or (e) metal.

The polar resin (a) is, for example, at least one polar resin selected from among the group consisting of polyamide resin, polyester resin, polycarbonate resin, polyvinyl acetal resin, polyphenylene sulfide resin, (meth)acrylonitrile-butadiene-styrene resin, (meth)acrylonitrile-styrene resin, (meth)acrylic acid ester-butadiene-styrene resin, (meth)acrylic acid ester-styrene resin, epoxy resin, phenolic resin, diallyl phthalate resin, polyimide resin, melamine resin, polyvinyl alcohol resin, ethylene-vinyl alcohol resin, ethylene-(meth)acrylic acid ester resin, polyvinyl acetate resin, poly(meth)acrylate resin, ionomer resin, polyurethane resin, polyurea resin, polyacetal resin, polysulfone resin, polyether sulfone resin, polyphenylene ether resin, polyarylate resin, and polyether ether ketone resin.

Examples of the resin employed in the resin containing an inorganic filler (b) include polyamide resin, polyester resin, polycarbonate resin, polyphenylene sulfide resin, (meth)acrylonitrile-butadiene-styrene resin, (meth)acrylonitrile-styrene resin, (meth)acrylic acid ester-butadiene-styrene resin, (meth)acrylic acid ester-styrene resin, butadiene-styrene resin, epoxy resin, phenolic resin, diallyl phthalate resin, polyimide resin, melamine resin, polyacetal resin, polysulfone resin, polyether sulfone resin, polyether imide resin, polyphenylene ether resin, polyarylate resin, polyether ether ketone resin, polystyrene resin, syndiotactic polystyrene resin, and polyolefin resin. These resins may be used singly or in combination of two or more species. Examples of the inorganic filler include calcium carbonate, talc, magnesium hydroxide, aluminum hydroxide, mica, clay, naturally occurring silicic acid, synthetic silicic acid, titanium oxide, carbon black, barium sulfate, glass fiber, and glass balloon. Of these, glass fiber is particularly preferred. These inorganic fillers may be used singly or in combination of two or more species.

The inorganic filler content preferably falls within a range in which the processability and mechanical strength of the resin containing the inorganic filler(s) are not impaired. Generally, the inorganic filler content, with respect to 100 parts by mass of the resin, is preferably 0.1 to 100 parts by mass, more preferably 1 to 50 parts by mass, still more preferably 3 to 40 parts by mass.

No particular limitation is imposed on the method of producing an article formed of the thermoplastic polymer composition of the present invention and the aforementioned resin containing a polar resin or an inorganic filler (preferably, glass fiber). The two components may be simultaneously melted and co-extruded or co-injected. Alternatively, a solution or a melt of one component may be applied onto an article of the other component. Yet alternatively, the two components may be double-molded or insert-molded.

The ceramic material (c) is a non-metallic inorganic material such as a metal oxide, a metal carbide, or a metal nitride. Examples include glass, cement, alumina, zirconia, zinc oxide ceramic material, barium titanate, lead titanate zirconate, silicon carbide, silicon nitride, and ferrite.

Examples of the metal (e) include iron, copper, aluminum, magnesium, nickel, chromium, zinc, and alloys produced therefrom. The surface of the article may be coated through plating with copper, nickel, chromium, tin, zinc, platinum, gold, silver, or the like.

No particular limitation is imposed on the method for producing the article in which the thermoplastic polymer composition is adhered to ceramic material, glass, or metal, and any method may be employed, so long as the method produces a adhered article through melt bonding. Examples of the molding method which may be employed include injection molding, injection compression, extrusion, press molding, and molten salt casting. In one production procedure through injection molding, glass plates having predetermined shapes and dimensions are placed in a metal mold, and the thermoplastic polymer composition of the present invention is injected into the metal mold, to thereby produce a adhered article. In one production procedure of the adhered article through extrusion, the thermoplastic polymer composition in a molten state is directly extruded through a die of a predetermined shape attached to the extruder against the main surfaces or the end surfaces of glass plates having predetermined shapes and dimensions, to thereby produce a adhered article. Alternatively, an article is formed in advance through injection molding or extrusion from the thermoplastic polymer composition of the present invention, and the article is heat-pressed to glass plates having predetermined shapes and dimensions by means of a press molding machine. In this case, the surface of the article which does not come into contact with the glass may be coated, in accordance with needs, with a layer of a non-polar resin such as olefin resin or cyclic olefin resin serving as the outer most layer for protection and decoration.

No particular limitation is imposed on the shape, structure, use, etc. of the article in which the thermoplastic polymer composition of the present invention is adhered. So long as the thermoplastic polymer composition of the present invention is adhered to polar resin, resin containing an inorganic filler (particularly, glass fiber), ceramic material, glass, or metal, to form structures, any of the structures are encompassed by the scope of the present invention. Meanwhile, housing members of electronic/electric apparatuses, OA apparatuses, home appliances, automobile parts, etc. are made of polar resin, resin containing a glass fiber, or a light metal such as aluminum or magnesium. These housing members may be formed of an article in which the thermoplastic polymer composition of the present invention is bonded. More specifically, the thermoplastic polymer composition of the present invention is suited for a shock absorber, an anti-slip coating, a waterproof material, and a design and decorative material and is attached to housings of wide displays, notebook personal computers, mobile phones, PHS, PDA (e.g., mobile information terminals such as electronic organizers), electronic dictionaries, video cameras, digital still cameras, mobile radio-cassette replaying apparatuses, inverters, etc. The article of the present invention also finds a wide range of uses as structures and articles in contact with glass; e.g., window molds and gaskets of automobiles and buildings, glass sealing members, and anti-corrosive members. The article of the present invention is also suitable for bonding parts between glass and aluminum-framed sash windows, metal openings, etc. of automobiles and buildings, connection parts between glass and metal frames in solar cell modules, and the like. Furthermore, the article of the present invention is suitably used in information terminals such as notebook personal computers, mobile phones, and video cameras; and as a secondary battery separator of hybrid automobiles, fuel cell automobiles, etc.

The thermoplastic polymer composition of the present invention is suitably used as an adhesive. As shown in the Examples, the thermoplastic polymer composition of the present invention, which provides excellent adhesion to polar resin, resin containing an inorganic filler (particularly, glass fiber), ceramic material, glass, or metal, is suitably used as an adhesive for bonding different types of materials. In addition, since the composition of the invention also has flexibility, the composition provides buffering action to difference in thermal expansion coefficient between hetero-materials.

EXAMPLES

The present invention will next be described in detail by way of examples, which should not be construed as limiting the invention thereto. The physical properties of the Referential Example and the Examples were measured through the following methods.

(1) Styrene Content of Hydrogenated Block Copolymer (a1), Hydrogenated Block Copolymer (a2), and End-Modified Hydrogenated Block Copolymer (x) (Polymer Block A Content)

A hydrogenated block copolymer was dissolved in heavy chloroform, and the $^1$H-NMR of the solution was measured by means of an NMR spectrometer "AVANCE III 400N" (product of Bruker). The styrene content was calculated therefrom.

(2) Percent Hydrogenation of Hydrogenated Block Copolymer (a1), Hydrogenated Block Copolymer (a2), and End-Modified Hydrogenated Block Copolymer (x)

The iodine value of a block copolymer was measured before and after hydrogenation. Percent hydrogenation was calculated by the following equation:

Percent hydrogenation (%)={1−(iodine value of block copolymer after hydrogenation/iodine value of block copolymer before hydrogenation)}×100

(3) Weight Average Molecular Weight and Molecular Weight Distribution Factor of Hydrogenated Block Copolymer (a1), Hydrogenated Block Copolymer (a2), and End-Modified Hydrogenated Block Copolymer (x)

The weight average molecular weight and the molecular weight distribution factor of a block copolymer after hydrogenation were determined through GPC by means of "GPC8020" (product of Tosoh Corporation) under the following conditions [measurement conditions; column: "TSK gel 4000HXL" (product of Tosoh Corporation), column temperature: 40° C., eluent: tetrahydrofuran, and flow rate: 1 mL/min].

(4) Measurement of 1,2-Bond Content and 3,4-Bond Content

A non-hydrogenated end-modified block copolymer was dissolved in heavy chloroform, and the $^1$H-NMR of the solution was measured by means of an NMR spectrometer "AVANCE III 400N" (product of Bruker). The 1,2-bond content and 3,4-bond content were calculated from integrated values of peaks observed at 4.2 to 5.0 ppm attributed to 1,2-bond unit and 3,4-bond unit and a value of a peak observed at 5.0 to 5.45 ppm attributed to 1,4-bond unit.

(5) Melt Viscosity of Thermoplastic Elastomer (c)

Measured by means of a "Flow Tester CFT500" (product of Shimadzu Corporation) at 200° C. under a load of 50 kgf.

(6) Average Hydroxyl Value of End-Modified Hydrogenated Block Copolymer (x)

A non-hydrogenated end-modified block copolymer was dissolved in heavy chloroform, and the $^1$H-NMR of the solution was measured by means of an NMR spectrometer "AVANCE III 400N" (product of Bruker). The average hydroxyl value of the sample was calculated by the following equation:

Average hydroxyl value=(amount by mole of end hydroxyl groups calculated from the integrated value of hydrogen atoms bonded to the carbon atom adjacent to the end hydroxyl group, which integrated value was determined through $^1$H-NMR spectroscopy of the end-modified hydrogenated block copolymer (x))/(amount by mole of end initiator calculated from the integrated value of end hydrogen atoms)

(7) Moldability

The MFR of each of the pelletized thermoplastic polymer compositions produced in the Examples and Comparative Examples was determined in accordance with the method described in JIS K 7210 at 230° C. under a load of 2.16 kg, whereby the moldability of the composition was evaluated. Generally, the higher the MFR, the more excellent the moldability. The MRF is preferably 0.5 g/10 min or more.

(8) Hardness

Sheet samples each having a thickness of 2 mm were formed from the thermoplastic polymer compositions produced in the Examples and Comparative Examples. The Shore A hardness of each sample was measured in accordance with the method described in JIS K 6253, whereby the flexibility of the sample was evaluated.

(9) Tensile Strength at Break and Tensile Elongation at Break

Sheet samples each having a thickness of 2 mm were formed from the thermoplastic polymer compositions produced in the Examples and Comparative Examples. The tensile strength at break and tensile elongation at break of each sample in the MD direction were measured in accordance with the method described in JIS K 6251 at a tensile speed of 500 mm/min, whereby the mechanical properties of the sample were evaluated. The tensile strength at break is preferably 4 MPa or higher, and the tensile elongation at break is preferably 600% or higher.

(10) Adhesion

The adhesion strength of each of the laminated products produced in the Examples and Comparative Examples was measured in accordance with the method described in JIS K 6854-2 at a peeling angle of 180° and a tensile speed of 50 mm/min, whereby the adhesion of the sample was evaluated.

(11) Coloring Resistance

Sheet samples each having a thickness of 1 mm were formed from the thermoplastic polymer compositions produced in the Examples and Comparative Examples. The b value of each sheet samples was measured by means of a hue meter, "ND-300A," product of Nippon Denshoku Industries, Co., Ltd. in accordance with the method described in JIS K 7105, whereby the coloring resistance of the sample was evaluated. Generally, the lower the b value, the less the coloration; i.e., the more excellent the coloration prevention performance. The b value is preferably 6.6 or less.

Referential Example 1

Production of Hydrogenated Block Copolymer (a1-i)

To a nitrogen-substituted and dried pressure container, 80 L of cyclohexane serving as a solvent and 0.17 L of sec-butyllithium (10-mass % cyclohexane solution) serving as an initiator were fed. The mixture was heated to 50° C., and 3.9 L of styrene was added to the container, where polymerization was performed for 3 hours. Subsequently, a liquid mixture of 12.1 L of isoprene and 10.9 L of butadiene was added to the container, and polymerization was performed for 4 hours. Then, 3.9 L of styrene was added to the container, and polymerization was performed for 3 hours. The thus-obtained polymerization reaction mixture was poured into 80 L of methanol, and the precipitated solid was separated through filtration. The solid was dried at 50° C. for 20 hours, to thereby produce a polystyrene-poly(isoprene/butadiene)-polystyrene triblock copolymer. Subsequently, 20 kg of the thus-produced polystyrene-poly(isoprene/butadiene)-polystyrene triblock copolymer was dissolved in 200 L of cyclohexane, and 5 mass %, with respect to the copolymer, of palladium carbon (amount of deposited palladium: 5 mass %) serving as a hydrogenation catalyst was added to the copolymer. The mixture was allowed to react at 150° C. and a hydrogen pressure of 2 MPa for 10 hours. The reaction was allowed to cool, and the pressure was returned to ambient pressure. The palladium carbon was removed through filtration, and the filtrate was concentrated and dried in vacuum, to thereby produce a hydrogenated polystyrene-poly(isoprene/butadiene)-polystyrene triblock copolymer (hereinafter abbreviated as hydrogenated block copolymer (a1-i)). The thus-produced hydrogenated block copolymer (a1-i) was found to have a styrene content of 32 mass %, a percent hydrogenation of 97%, a weight average molecular weight of 170,000, a molecular weight distribution factor of 1.04, and a sum of the 1,2-bond content and 3,4-bond content of 5 mol %.

Referential Example 2

Production of Hydrogenated Block Copolymer (a1-ii)

The procedure of Referential Example 1 was repeated, except that 0.30 L of sec-butyllithium (10-mass % cyclohexane solution) serving as an initiator was used, and in polymerization and hydrogenation, monomers of 3.6 L of styrene, 26.1 L of butadiene, and 3.6 L of styrene were successively added and polymerized in the presence of 0.13 L of tetrahydrofuran serving as a Lewis base, to thereby yield 20 kg of a hydrogenated polystyrene-polybutadiene-polystyrene triblock copolymer (hereinafter abbreviated as hydrogenated block copolymer (a1-ii)). The thus-produced hydrogenated block copolymer (a1-ii) was found to have a styrene content of 29 mass %, a percent hydrogenation of 95%, a weight average molecular weight of 110,000, a molecular weight distribution factor of 1.03, and a sum of the 1,2-bond content and 3,4-bond content of 40 mol %.

Referential Example 3

Production of Hydrogenated Block Copolymer (a2-i)

The procedure of Referential Example 1 was repeated, except that 0.26 L of sec-butyllithium (10-mass % cyclohexane solution) serving as an initiator was used, and in polymerization and hydrogenation, monomers of 7.5 L of styrene, 10.7 L of isoprene, and 7.5 L of styrene were successively added and polymerized, to thereby yield 20 kg of a hydrogenated polystyrene-polyisoprene-polystyrene triblock copolymer (hereinafter abbreviated as hydrogenated block copolymer (a2-i)). The thus-produced hydrogenated block copolymer (a2-i) was found to have a styrene content of 65 mass %, a percent hydrogenation of 95%, a weight average molecular weight of 80,000, a molecular weight distribution factor of 1.02, and a sum of the 1,2-bond content and 3,4-bond content of 5 mol %.

percent hydrogenation of 95%, a weight average molecular weight of 92,000, a molecular weight distribution factor of 1.03, and a sum of the 1,2-bond content and 3,4-bond content of 5 mol %.

Table 1 shows the physical properties of the hydrogenated block copolymers produced in Referential Examples 1 to 5.

TABLE 1

|  | Ref. Ex. 1 | Ref. Ex. 2 | Ref. Ex. 3 | Ref. Ex. 4 | Ref. Ex. 5 |
|---|---|---|---|---|---|
|  | Hydrogenated block copolymers | | | | |
|  | (a1-i) | (a1-ii) | (a2-i) | (a1-iii) | (a1-iv) |
| Polymer block (A1) or (A2) content (mass %) | 32 | 29 | 65 | 30 | 30 |
| Compound(s) forming polymer block (B1) or (B2) | isoprene/ butadiene | butadiene | isoprene | isoprene | isoprene/ butadiene |
| 1,2- And 3,4-bond content of polymer block (B1) or (B2) (mol %) | 5 | 40 | 5 | 5 | 5 |
| Wt. av. mol. wt. of hydrogenated block copolymer | 170,000 | 110,000 | 80,000 | 54,000 | 92,000 |
| Mol. wt. distribution factor of hydrogenated block copolymer | 1.04 | 1.03 | 1.02 | 1.02 | 1.03 |
| Percent hydrogenation of hydrogenated block copolymer (%) | 97 | 95 | 95 | 95 | 95 |

Referential Example 4

Production of Hydrogenated Block Copolymer (a1-iii)

The procedure of Referential Example 1 was repeated, except that 0.55 L of sec-butyllithium (10-mass % cyclohexane solution) serving as an initiator was used, and in polymerization and hydrogenation, monomers of 3.8 L of styrene, 23.7 L of isoprene, and 3.8 L of styrene were successively added and polymerized, to thereby yield 20 kg of a hydrogenated polystyrene-polyisoprene-polystyrene triblock copolymer (hereinafter abbreviated as hydrogenated block copolymer (a1-iii)). The thus-produced hydrogenated block copolymer (a1-iii) was found to have a styrene content of 30 mass %, a percent hydrogenation of 95%, a weight average molecular weight of 54,000, a molecular weight distribution factor of 1.02, and a sum of the 1,2-bond content and 3,4-bond content of 5 mol %.

Referential Example 5

Production of Hydrogenated Block Copolymer (a1-iv)

The procedure of Referential Example 1 was repeated, except that 0.32 L of sec-butyllithium (10-mass % cyclohexane solution) serving as an initiator was used, and in polymerization and hydrogenation, monomers; i.e., 3.7 L of styrene, a mixture of 13.2 L of isoprene and 10.8 L of butadiene, and 3.7 L of styrene were sequentially added and polymerized, to thereby yield 20 kg of a hydrogenated polystyrene-poly(isoprene/butadiene)-polystyrene triblock copolymer (hereinafter abbreviated as hydrogenated block copolymer (a1-iv)). The thus-produced hydrogenated block copolymer (a1-iv) was found to have a styrene content of 30 mass %, a Referential Example 6

Production of Polyvinyl Acetal (b1)

A polyvinyl alcohol having an average polymerization degree of 1,000 and a seponification degree of 99 mol % was dissolved in water. n-Butylaldehyde and an acid catalyst (hydrochloric acid) were added to the aqueous solution, and the mixture was stirred, to thereby precipitate the polyvinyl acetal resin. The resin was washed through a known method so as to adjust the pH to 6 and suspended in an alkalized aqueous medium under stirring for post treatment. The suspension was washed so as to adjust the pH to 7 and dried until the volatile content was reduced to 0.3%, to thereby produce polyvinyl acetal (b1) (polyvinyl butyral) having a percent acetalization of 80%.

Referential Example 7

Production of Thermoplastic Elastomer (c1)

The procedure of Referential Example 1 was repeated, except that 0.51 L of sec-butyllithium (10-mass % cyclohexane solution) serving as an initiator was used, and in polymerization and hydrogenation, a monomer solution mixture of 3.5 L of styrene, 13.1 L of isoprene, and 11.8 L of butadiene and 3.5 L of styrene were successively added and polymerized, and then 0.05 L of ethylene oxide was added, to thereby yield 20 kg of a hydrogenated polystyrene-poly(isoprene/butadiene)-polystyrene triblock copolymer having a hydroxyl group at an end of a molecular backbone thereof (hereinafter abbreviated as end-modified hydrogenated block copolymer (x1)). The thus-produced end-modified hydrogenated block copolymer (x1) was found to have a styrene content of 30 mass %, a percent hydrogenation of 95%, a weight average molecular weight of 200,000, an average hydroxyl value of 0.9, and a sum of the 1,2-bond content and 3,4-bond content of 5 mol %. Then, 100 parts by mass of the thus-produced end-modified hydrogenated block copolymer (x1) was dry-blended with 100 parts by mass of a thermoplastic polyurethane ("Kuramiron U 2000": polyester-based polyurethane elastomer with aliphatic polyester soft segment, product of Kuraray Co. Ltd.), and the blend was melt-kneaded by means of a twin-screw extruder at a cylinder temperature of 220° C. and a screw rotation of 150 rpm. The kneaded product was extruded and cut, to thereby form pellets thereof. The thus-obtained pellets were subjected to extraction with dimethylformamide, to thereby remove unreacted polyurethane. Subsequently, unreacted end-modified hydrogenated block copolymer (x1) was removed through extraction with cyclohexane. The thus-obtained solid was dried, to thereby produce thermoplastic elastomer (c1) in which the end-modified hydrogenated block copolymer (x1) was bonded to the thermoplastic polyurethane block and which had a melt viscosity of 10 kPa·s.

Examples 1 to 6, and Comparative Examples 1 to 5

(12)

Each of hydrogenated block copolymers produced in Referential Examples 1 to 5, polyvinyl acetal (b1) produced in Referential Example 6, and thermoplastic elastomer (c1) produced in Referential Example 7 were mixed together at compositional proportions by mass shown in Table 2, to thereby produce a thermoplastic polymer composition. The composition was melt-kneaded by means of a twin-screw extruder at a cylinder temperature of 230° C. and a screw rotation of 200 rpm and extruded to form strands. The strands were cut, to thereby produce pellets of the thermoplastic polymer composition.

The moldability of the thus-pelletized thermoplastic polymer composition was evaluated through the aforementioned method. Separately, the thus-obtained pellets of the thermoplastic polymer composition were molded by means of an injection molding apparatus (cylinder temperature: 230° C., injection cycle: 30 seconds), to thereby provide sheets each having a thickness of 1 mm or 2 mm. By use of the sheets, evaluation of coloring resistance, hardness, tensile strength at break, and tensile elongation at break, and measurement of adhesion in (13) to (16) were performed.

(13) Production of Laminated Product with Polar Resin or Polar Resin Containing Glass Fiber A polar resin (polybutylene terephthalate (PBT)) sheet or a polybutylene terephthalate (PBT-GF) sheet containing 30 mass % glass fiber, having dimensions of 100 mm in length× 35 mm in width×1 mm in thickness; a sheet of the thermoplastic polymer composition produced in (12) having dimensions of 100 mm in length×35 mm in width×1 mm in thickness; and a polyethylene terephthalate (PET) sheet having dimensions of 100 mm in length×35 mm in width×50 μm in thickness were stacked in this order. The stacked product was placed in the center of a metal spacer of a square frame shape having dimensions of 200 mm in outer side×200 mm in outer side, 150 mm in inner side×150 mm in inner side, ×2 mm in thickness. The stacked body including three sheets and placed in the square frame metal spacer was sandwiched by polytetrafluoroethylene sheets (hereinafter referred to as PTFE sheets) each having dimensions of 200 mm in side×200 mm in side×250 μm in thickness, and the sandwiched structure was further sandwiched by metal plates. The resultant structure was heated by means of a compression molder at 2 MPa and 210° C. for 3 minutes, to thereby produce a laminate. The adhesion of the laminate was evaluated through the method described in (10). In each case, an adhesion of 10 N/25 mm or higher is preferred. Table 2 shows the results.

(14) Production of Laminated Product with Glass Plate

A glass plate having dimensions of 75 mm in length×25 mm in width×1 mm in thickness was surface-washed sequentially with aqueous neutral detergent, methanol, acetone, and distilled water, and then dried. The glass plate, a sheet of the thermoplastic polymer composition produced in (12) having dimensions of 100 mm in length×35 mm in width×1 mm in thickness; and a polyethylene terephthalate (PET) sheet having dimensions of 100 mm in length×35 mm in width×50 μm in thickness were stacked in this order. The stacked product was placed in the center of a metal spacer of a square frame shape having dimensions of 200 mm in outer side×200 mm in outer side, 150 mm in inner side×150 mm in inner side, ×2 mm in thickness. The stacked body including three sheets and placed in the square frame metal spacer was sandwiched by PTFE sheets, and the sandwiched structure was further sandwiched by metal plates. The resultant structure was heated by means of a compression molder at 2 MPa and 240° C. for 3 minutes, to thereby produce a laminate in which the thermoplastic polymer composition sheet was adhered to the glass plate. The adhesion of the laminate was evaluated through the aforementioned method. An adhesion of 80 N/25 mm or higher is preferred. Table 2 shows the results.

(15) Production of Laminated Product with Aluminum Plate

An aluminum plate having dimensions of 75 mm in length×25 mm in width×1 mm in thickness was degreased with aqueous neutral detergent. The aluminum plate, a sheet of the thermoplastic polymer composition produced in (12) having dimensions of 100 mm in length×35 mm in width×1 mm in thickness; and a polyethylene terephthalate (PET) sheet having dimensions of 100 mm in length×35 mm in width×50 μm in thickness were stacked in this order. The stacked product was placed in the center of a metal spacer of a square frame shape having dimensions of 200 mm in outer side×200 mm in outer side, 150 mm in inner side×150 mm in inner side, ×2 mm in thickness. The stacked body including the aluminum plate and the other two sheets and placed in the square frame metal spacer was sandwiched by PTFE sheets, and the sandwiched structure was further sandwiched by metal plates. The resultant structure was heated by means of a compression molder at 2 MPa and 240° C. for 3 minutes, to thereby produce a laminate in which the thermoplastic polymer composition sheet was adhered to the aluminum plate. The adhesion of the laminate was evaluated through the aforementioned method. An adhesion of 80 N/25 mm or higher is preferred. Table 2 shows the results.

(16) Production of Laminated Product with Magnesium Alloy Plate

A magnesium alloy plate having dimensions of 75 mm in length×25 mm in width×2 mm in thickness was degreased with aqueous neutral detergent. The magnesium alloy plate, a sheet of the thermoplastic polymer composition produced in (12) having dimensions of 100 mm in length×35 mm in width×1 mm in thickness; and a polyethylene terephthalate (PET) sheet having dimensions of 100 mm in length×35 mm in width×50 μm in thickness were stacked in this order. The stacked product was placed in the center of a metal spacer of a square frame shape having dimensions of 200 mm in outer side×200 mm in outer side, 150 mm in inner side×150 mm in inner side, ×3 mm in thickness. The stacked body including the magnesium alloy plate and the other two sheets and placed in the square frame metal spacer was sandwiched by PTFE sheets, and the sandwiched structure was further sandwiched by metal plates. The resultant structure was heated by means of a compression molder at 2 MPa and 240° C. for 3 minutes, to thereby produce a laminate in which the thermoplastic polymer composition sheet was adhered to the magnesium plate. The adhesion of the laminate was evaluated through the aforementioned method. An adhesion of 50 N/25 mm or higher is preferred. Table 2 shows the results.

[PBT]
"Traycon 1041" (trade name, polybutylene terephtalate (sheet thickness: 1 mm), product of Toray Industries, Inc.)
[PBT-GF]
"Traycon 1101G-30" (trade name, polybutylene terephtalate containing 30 mass % of glass fiber (sheet thickness: 1 mm), product of Toray Industries, Inc.)
[PET]
Polyethylene terephthalate, "Bottle TR-8550" (trade name, product of Teijin Limited)
[PTFE sheet]
"Val Furon Valqua No. 7920" (trade name, product of Valqua SES)
[Glass]
"S1226" (trade name, product of MATSUNAMI Glass, thickness: 1 mm)
[Aluminum]
"A1050P" (trade name, product of Kobe Steel Ltd., thickness: 1 mm)
[Magnesium Alloy]
"AZ91D" (trade name, product of Nippon Kinzoku Co., Ltd., alloy with aluminum, zinc, etc. (thickness: 2 mm))
[Neutral Detergent]
"Contaminon N" (trade name, product of Wako Pure Chemical Industries, Ltd.)

In Comparative Examples 1 to 3, in which no hydrogenated block copolymer (a2) was used in combination with the hydrogenated block copolymer (a1), excellent mechanical properties, moldability, and coloring resistance were not be simultaneously attained. Particularly in Comparative Example 1, in which no thermoplastic elastomer (c) was used, adhesion was also reduced. As is clear from Comparative Examples 1 and 2, mechanical properties were found to be further reduced, when no thermoplastic elastomer (c) was used.

In Comparative Examples 4 and 5, in which two hydrogenated block copolymers (a1) were used, but no hydrogenated block copolymer (a2) was used, adhesion to glass and metal considerably decreased, although moldability and coloring resistance were improved as compared with Comparative Example 2.

INDUSTRIAL APPLICABILITY

Housing members of electronic/electric apparatuses, OA apparatuses, home appliances, automobile parts, etc. are made of polar resin, resin containing a glass fiber, or a light metal such as aluminum or magnesium, and the thermoplastic polymer composition of the present invention is adhered to those housing members. More specifically, the thermoplastic polymer composition of the present invention is attached to housings of wide displays, notebook personal computers, mobile phones, PHS, PDA (e.g., mobile information terminals such as electronic organizers), electronic dictionaries, video cameras, digital still cameras, mobile radio-cassette replaying apparatuses, inverters, etc., and is suited for a shock absorber, an anti-slip coating, a waterproof material, and a design and decorative material. The present invention also finds a wide range of uses as structures and articles in contact with glass; e.g., window molds and gaskets of automobiles

TABLE 2

| | | | Ex. | | | | | | Comp Ex. | | | |
|---|---|---|---|---|---|---|---|---|---|---|---|---|
| | | 1 | 2 | 3 | 4 | 5 | 6 | 1 | 2 | 3 | 4 | 5 |
| Thermoplastic polymer composition (parts by mass) | | | | | | | | | | | | |
| Hydrogenated block copolymer (a1-i) | | 90 | 90 | 90 | 90 | 70 | | 100 | 100 | 100 | 90 | 90 |
| Hydrogenated block copolymer (a1-ii) | | | | | | | 90 | | | | | |
| Hydrogenated block copolymer (a2-i) | | 10 | 10 | 10 | 10 | 30 | 10 | | | | | |
| Hydrogenated block copolymer (a1-iii) | | | | | | | | | | | 10 | |
| Hydrogenated block copolymer (a1-iv) | | | | | | | | | | | | 10 |
| Polyvinyl acetal (b1) | | 30 | 20 | 30 | 30 | 30 | 30 | 30 | 30 | 30 | 30 | 30 |
| Thermoplastic elastomer (c1) | | 3 | 3 | 3 | 3 | 10 | 3 | 3 | — | 3 | 30 | 3 | 3 |
| Softener*[1] | | 100 | 100 | 70 | 100 | 100 | 100 | 100 | 100 | 100 | 100 | 100 |
| Properties | Hardness | 50 | 40 | 66 | 53 | 55 | 50 | 49 | 45 | 57 | 39 | 47 |
| | Coloring resistance (b) | 6.1 | 6.0 | 6.5 | 6.1 | 5.8 | 5.9 | 7.8 | 7.0 | 8.2 | 5.7 | 6.0 |
| | Tensile strength at break (MPa) | 4.9 | 5.9 | 7.6 | 4.6 | 4.5 | 4.5 | 5.7 | 5.7 | 3.0 | 3.0 | 3.1 |
| | Tensile elongation at break (%) | 700 | 800 | 630 | 650 | 650 | 650 | 800 | 770 | 490 | 800 | 760 |
| | Moldability (MFR-g/10 min) | 0.7 | 1.0 | 0.6 | 0.6 | 0.8 | 1.0 | 0.5 | 0.5 | 0.3 | 1.3 | 0.6 |
| Adhesion (N/25 mm) | PBT | 18 | 13 | 22 | 24 | 15 | 14 | 4 | 13 | 25 | 13 | 15 |
| | PBT-GF30 | 56 | 47 | 60 | 42 | 52 | 45 | 5 | 48 | 30 | 26 | 33 |
| | Glass | 128 | 92 | 130 | 133 | 98 | 117 | 74 | 95 | 150 | 26 | 15 |
| | Al | 129 | 94 | 132 | 131 | 95 | 110 | 70 | 97 | 110 | 28 | 18 |
| | Mg alloy | 125 | 83 | 120 | 127 | 89 | 95 | 48 | 53 | 134 | 15 | 9 |

*[1]"Diana Process PW-90" (trade name, paraffin-based process oil, product of Idemitsu Kosan Co., Ltd.)

As is clear from Table 2, the thermoplastic polymer compositions falling within the scope of the present invention and produced in Examples 1 to 6 were found to have excellent flexibility, mechanical properties, moldability, coloring resistance, and adhesion.

and buildings, glass sealing members, and anti-corrosive members. The present invention is also suited for bonding parts between glass and aluminum-framed sash windows, metal openings, etc. of automobiles and buildings, connection parts between glass and metal frames in solar cell modules, and the like. Furthermore, the article of the present invention is suitably used in information terminals such as notebook personal computers, mobile phones, and video cameras; and as a secondary battery separator of hybrid automobiles, fuel cell automobiles, etc.

Since the thermoplastic polymer composition of the present invention provides excellent adhesion to polar resin, resin containing an inorganic filler (particularly, glass fiber), ceramic material, glass, or metal, the composition is suitably used as an adhesive for bonding different types of materials.

The invention claimed is:

1. A thermoplastic polymer composition comprising:
   100 parts by mass of a hydrogenated block copolymer mixture (a);
   0.1 to 100 parts by mass of a polyvinyl acetal (b); and
   0.1 to 20 parts by mass of a thermoplastic elastomer (c),
   wherein the hydrogenated block copolymer mixture (a) comprises:
   a hydrogenated block copolymer (a1) comprising at least one polymer block (A1) comprising an aromatic vinyl compound unit and at least one hydrogenated polymer block (B1) comprising a conjugated diene compound unit wherein the polymer block (A1) content is 5 mass % or higher and lower than 40 mass %, and
   a hydrogenated block copolymer (a2) comprising at least one polymer block (A2) comprising an aromatic vinyl compound unit and at least one hydrogenated polymer block (B2) comprising a conjugated diene compound unit wherein the polymer block (A2) content is 40 mass % to 70 mass %;
   the polyvinyl acetal (b) is obtained by acetalization of a polyvinyl alcohol having an average polymerization degree of 100 to 4,000, and the polyvinyl acetal (b) has an acetalization degree of 55 to 88 mol %; and
   the thermoplastic elastomer (c) comprises at least one polymer block (A3) comprising an aromatic vinyl compound unit, at least one hydrogenated polymer block (B3) comprising a conjugated diene compound unit, and at least one polymer block comprising a polar functional group (C).

2. The thermoplastic polymer composition of claim 1, wherein the polyvinyl acetal (b) is polyvinyl butyral.

3. The thermoplastic polymer composition of claim 1, further comprising a softener (d) in an amount of 0.1 to 300 parts by mass with respect to 100 parts by mass of the hydrogenated block copolymer mixture (a).

4. The thermoplastic polymer composition of claim 1, which has a ratio (a1)/(a2) by mass of hydrogenated block copolymer (a1) to hydrogenated block copolymer (a2) in a range of 99/1 to 50/50.

5. An article comprising the thermoplastic polymer composition of claim 1.

6. The article of claim 5, wherein the thermoplastic polymer composition is adhered to a polar resin, a resin comprising an inorganic filler, a ceramic material, or a metal.

7. The article of claim 6, wherein the resin comprising an inorganic filler has an inorganic filler content of 0.1 to 100 parts by mass with respect to 100 parts by mass of the resin.

8. The article of claim 6, wherein the inorganic filler is glass fiber.

9. The thermoplastic polymer composition of claim 1, wherein the hydrogenated block copolymer (a1) has a polymer block (A1) content of 20 to 35 mass %.

10. The thermoplastic polymer composition of claim 1, wherein the hydrogenated block copolymer (a2) has a polymer block (A2) content of 55 to 70 mass %.

11. The thermoplastic polymer composition of claim 1, wherein the polymer blocks (A1) and (A2) each independently comprise at least one aromatic vinyl compound unit selected from the group consisting of styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene.

12. The thermoplastic polymer composition of claim 1, wherein the polymer blocks (A1) and (A2) each independently comprise at least one aromatic vinyl compound unit selected from the group consisting of styrene, α-methylstyrene, and 4-methylstyrene.

13. The thermoplastic polymer composition of claim 1, wherein the polymer blocks (A1) and (A2) each independently comprise 70 mol % or greater of the aromatic vinyl compound unit.

14. The thermoplastic polymer composition of claim 1, wherein the polymer blocks (A1) and (A2) each independently comprise 95 mol % or greater of the aromatic vinyl compound unit.

15. The thermoplastic polymer composition of claim 1, wherein the polymer blocks (B1) and (B2) each independently comprise at least one conjugated diene compound unit selected from the group consisting of butadiene, isoprene, 2,3-dimethyl-1,3-butadiene, 1,3-pentadiene, and 1,3-hexadiene.

16. The thermoplastic polymer composition of claim 1, wherein the polymer blocks (B1) and (B2) each independently comprise at least one conjugated diene compound unit selected from the group consisting of butadiene and isoprene.

17. The thermoplastic polymer composition of claim 1, wherein the polymer blocks (B1) and (B2) each independently comprise 70 mol % or greater of the conjugated diene compound unit.

18. The thermoplastic polymer composition of claim 1, wherein the polymer blocks (B1) and (B2) each independently comprise 95 mol % or greater of the conjugated diene compound unit.

19. The thermoplastic polymer composition of claim 1, wherein the percent hydrogenation of polymer blocks (B1) and (B2) is 80% or higher.

20. The thermoplastic polymer composition of claim 1, wherein the percent hydrogenation of polymer blocks (B1) and (B2) is 90% or higher.

* * * * *